United States Patent [19]

Davis

[11] 4,425,785
[45] Jan. 17, 1984

[54] MISSILE ROLLING TAIL BRAKE TORQUE SYSTEM

[75] Inventor: William T. Davis, Yorktown, Va.

[73] Assignee: The United States of America as represented by the Administrator of the National Aeronautics and Space Administration, Washington, D.C.

[21] Appl. No.: 338,386

[22] Filed: Jan. 11, 1982

[51] Int. Cl.³ ............... G01N 19/02; G01M 19/00
[52] U.S. Cl. ......................................... 73/9; 73/167; 73/432 R
[58] Field of Search ................... 73/9, 862.33, 862.34, 73/862.08, 167, 432 J, 7; 308/10

[56] References Cited

U.S. PATENT DOCUMENTS

| 4,154,489 | 5/1979 | Lyman | 308/10 |
| 4,169,367 | 10/1979 | Wunder et al. | 73/9 X |
| 4,235,092 | 11/1980 | Spall | 73/9 |
| 4,308,490 | 12/1981 | Habermann et al. | 308/10 X |

Primary Examiner—Gerald Goldberg
Assistant Examiner—E. Harding
Attorney, Agent, or Firm—Howard J. Osborn; John R. Manning; William H. King

[57] ABSTRACT

Apparatus for simulating varying levels of friction in the bearings 13 of a free rolling tail afterbody 11 on a canard-controlled missile 12 to determine friction effects on aerodynamic control characteristics. A ring 16 located between the missile body and the afterbody is utilized in a servo system to create varying levels of friction between the missile body and the afterbody to simulate bearing friction.

9 Claims, 6 Drawing Figures

MISSILE ROLLING TAIL BRAKE TORQUE SYSTEM

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

This invention relates generally to missiles and more particularly concerns the remote control of canard-controlled missiles.

It is well known that missile configurations utilizing forward surfaces to provide control (canard-controlled) experience the problem of induced rolling moments at supersonic Mach numbers. For these forward controlled configurations the need is either that of reducing or eliminating the induced rolling moments or of providing an efficient system for their control.

One suggested approach is to use a free rolling tail concept to reduce the adverse rolling moments on a canard-controlled missile. A free rolling tail reduces the rolling moments by uncoupling the tail from the missile airframe and also allows canard roll control at low angles of attack. The free rolling tail concept gives canard-controlled missiles more simplicity and modular flexibility by having a single cruciform canard-control system that provides pitch, yaw and roll control.

A free rolling tail-fin afterbody on a canard-controlled missile has bearings which have varying levels of friction. These varying levels of friction produce effects on the aerodynamic control characteristics.

In the past the arerodynamic control characteristics of a canard-controlled missile could only be determined with a fixed tail configuration or a free rolling tail configuration. The effects of varying levels of friction in the bearings of a free rolling tail afterbody on the aerodynamic control characteristics could not be determined.

Therefore, the primary object of this invention is to provide apparatus for determining friction effects on the aerodynamic control characteristics of a canard-controlled missile by simulating varying levels of friction in the bearings of a free rolling tail afterbody.

Other objects and advantages of this invention will become apparent hereinafter in the specification and drawings.

SUMMARY OF THE INVENTION

The above object is achieved by an apparatus for simulating varying levels of friction in the bearings between a free rolling tail afterbody and a canard-controlled missile body. A ring is located between the missile body and the tail afterbody. The ring is attached to the afterbody by fingers and grooves on both such that the ring rotates with the afterbody and is slideable longitudinally in the direction of the missile body until contact is made with the missile body. An electromagnet is mounted on the missile body such that the ring is part of the magnetic circuit. Consequently, when a voltage is applied to the coil of the electromagnet, the ring will slide against the body. A torque balance is attached to the missile body so that when the ring is in frictional contact with the missile body, the torque transmitted from the afterbody to the missile body is detected by the torque balance. The torque balance produces an electrical signal proportional to the friction between the ring and the missile body. A servo system including the electromagnet and the torque balance is utilized to apply calibrated signals to the coil of the electromagnet to produce different levels of friction between the ring and afterbody which simulates the friction in the bearings.

DETAILED DESCRIPTION OF THE INVENTION

Figure 1:
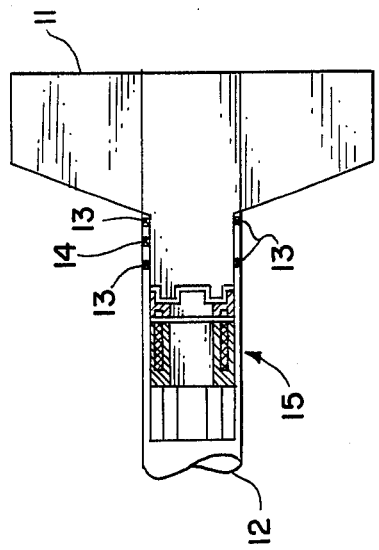
FIG. 1 is a schematic drawing of the embodiment of the invention selected for illustration in the drawings.

Turning now to the embodiment of the invention selected for illustration (see FIG. 1) the numeral 11 designates a tail afterbody mounted for free rolling on a canard-controlled missile body 12 by means of low friction ball bearings 13. A lock screw 14 is provided to inhibit the free rolling of afterbody 11 when desired. A rolling tail torque brake system 15 is provided for simulating varying levels of friction in the bearings of the free rolling tail afterbody 11. The details of the brake system 15 are further illustrated in FIGS. 2, 3 and 4.

Figure 2:
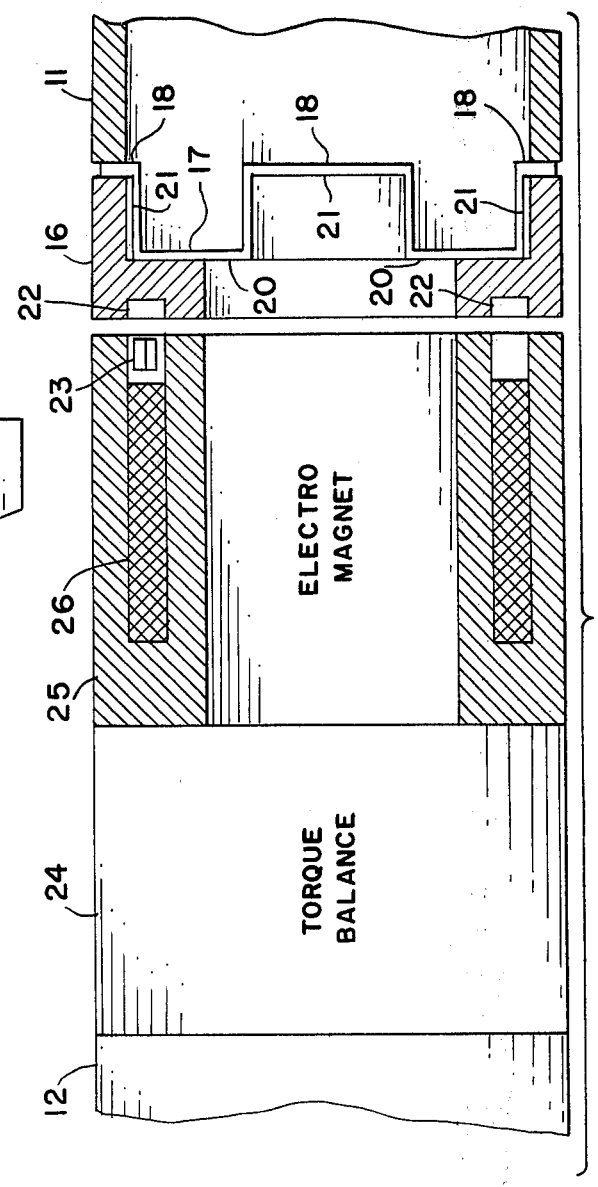
FIG. 2 is a cross-sectional view of the mechanical components of the invention.
Figure 3:
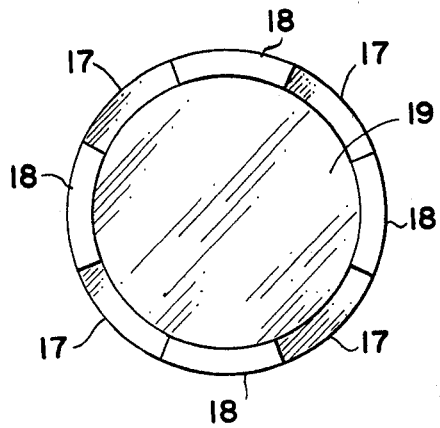
FIG. 3 is an end view of the afterbody in FIG. 2.
Figure 4:
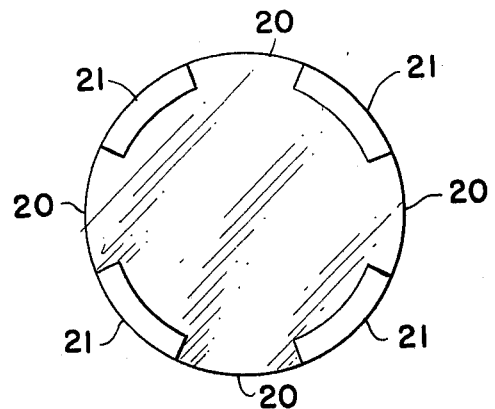
FIG. 4 is an end view of the ring in FIG. 2.

Slideably attached to afterbody 11 is a metal ring 16 (See FIG. 2). An end view of afterbody 11, as shown in FIG. 3, and an end view of ring 16, as shown in FIG. 4, show how afterbody 11 and ring 16 are slideably attached. Afterbody 11 includes fingers 17 and grooves 18 around its periphery which mesh with grooves 20 and fingers 21 around the periphery of ring 16. A cylinder 19 extends to the ends of fingers 17. Consequently, ring 16 is forced by the fingers and grooves to move rotationally with the afterbody 11, but can slideably move longitudinally relative to afterbody 11.

A reflecting ring 22 is mounted on the inside surface of ring 16 closest to the missile body 12. The reflecting ring 22 has alternate black and white segments to provide a pulse output from a photospeed transducer 23 as ring 16 rotates with afterbody 11 relative to missile body 12.

A strain gage torque balance 24 is mounted on missile body 12 and produces an output voltage which is a measure of the torque on the missile body caused by the rotation of afterbody 11 and the friction between ring 16 and missile body 12. An electromagnet 25 which includes a coil 26, is mounted on the torque balance 24. When a signal is applied to coil 26, a magnetic force is applied to ring 16 which tends to slide ring 16 toward the electromagnet 25, thereby closing the gap between the ring 16 and the electromagnet 25. The amplitude of the signal applied to coil 26 determines the rotational force applied from the rotating afterbody 11 through ring 16 to missile body 12. This rotational force is proportional to the signal produced by torque balance 24. The friction between ring 16 and electromagnet 25, when the two are forced together, produces the desired torque. A hard surface coating is flame sprayed onto the sliding surfaces to reduce wear. This coating is nonmagnetic and creates a magnetic gap which removes the problem of residual magnetism which would otherwise produce a large torque after a current is applied and removed.

Figure 5:
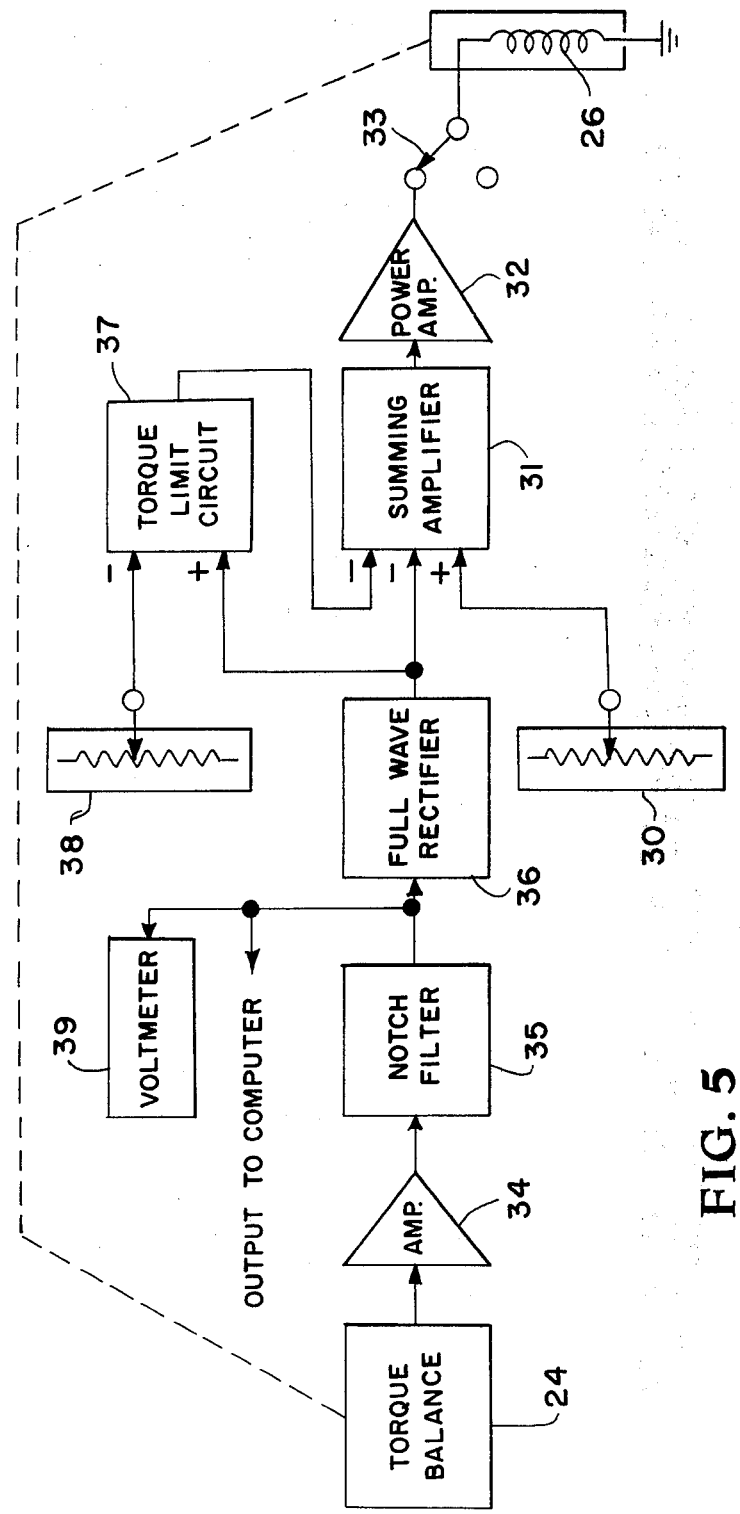
FIG. 5 is a block diagram of the electrical components of the invention.

Referring to FIG. 5, a selected positive voltage is applied from a calibrated voltage source 30 to a summing amplifier 31. The output of amplifier 31 is applied though a power amplifier 32 and a switch 33, shown in its closed position, to electromagnet coil 26. As a result, the magnetic force created by coil 26 slides ring 16 into contact with electromagnet 25. The friction between ring 16 and electromagnet 25 transmits a rotational force from afterbody 11 to torque balance 24. The output of torque balance 24 is applied through an amplifier 34, a notch filter 35 and a full wave rectifier 36 to summing amplifier 31 to subtract from the selected positive voltage from source 30. The friction between ring 16 and electromagnet 25 is proportional to the voltage selected at source 30 and is a simulation of friction in the bearings 13 between afterbody 11 and missile body 12. The purpose of notch filter 35 is to dampen vibrations in the torque balance 24. Since afterbody 11 can rotate in either direction, it will produce a feedback signal of either plus (+) or minus (−) polarity. Full wave rectifier 36 is used to ensure that the signal applied to summing amplifier 31 will be of the correct polarity. A torque limit circuit 37, which has its two inputs connected to the output of rectifier 36 and to a negative limit voltage supplied from voltage source 38 and its output connected to summing amplifier 31, limits the torque to any preset value of source 38, and thereby prevents damage to torque balance 24 should the torque command (source 30) be set too high. The output torque can be read out by a voltmeter 39 or the voltage at the output of notch filter 35 can be connected to a computer for processing.

Figure 6:
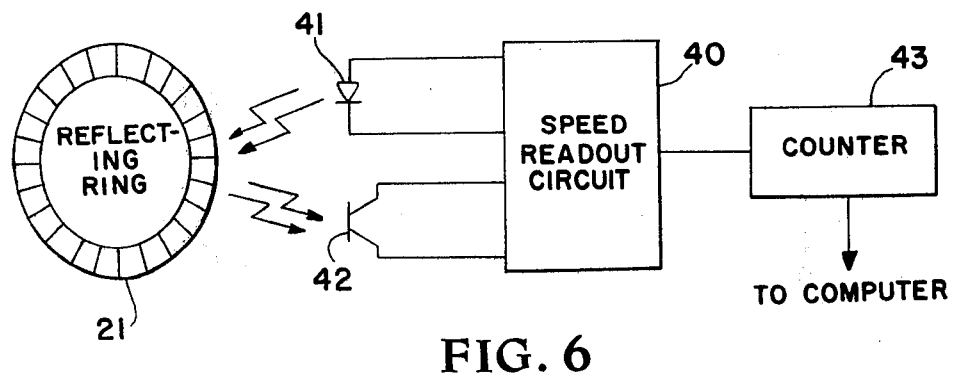
FIG. 6 is a block diagram of the electrical components for counting the revolutions of the afterbody.

A device for measuring the speed of rotation of afterbody 11 is shown in FIG. 6. A speed readout circuit 40 supplies voltage to a photo diode 41. The resulting light is focused onto reflecting ring 22. Each time a black segment passes, a pulse is produced at the output of circuit 40. These pulses are counted by a counter 43 and the count is connected to a computer for processing. The count on counter 43 is proportional to the speed of rotation of afterbody 11.

The advantage of this invention is that it will allow in-depth studies of the effects of tail-fin spin rates on canard pitch, yaw and roll control characteristics.

What is claimed as new and desired to be secured by Letters Patent of the United States is:

1. Apparatus for simulating varying levels of friction between a rotating body and a nonrotating body comprising:
    a ring between said rotating body and said nonrotating body;
    means for attaching said ring to said rotating body such that said ring rotates with said rotating body and is movable relative to said rotating body in the direction of said nonrotating body; and
    means for moving said ring in the direction of said nonrotating body to make frictional contact with said nonrotating body.

2. Apparatus as in claim 1 wherein said means for attaching said ring to said rotating body includes fingers and grooves on each of said ring and said rotating body that mesh.

3. Apparatus as in claim 1 wherein said means for moving said ring in the direction of said nonrotating body includes an electromagnet attached to said nonrotating body such that the magnetic path of the magnet is completed through said ring.

4. Apparatus as in claim 3 wherein said means for moving said ring further includes a torque balance that produces an electrical signal proportional to the torque applied to it, attached to said nonrotating body such that when said electromagnet causes said ring to make contact with said nonrotating body the friction between said ring and said nonrotating body applies a torque to said torque balance.

5. Apparatus as in claim 4 wherein said means for moving said ring comprises a servo system, including said electromagnet and said torque balance, in which a feedback signal is subtracted from a calibrated signal and the difference signal is applied to the coil of said electromagnet and the resulting signal produced by said torque balance is the feedback signal.

6. Apparatus as in claim 5 wherein said feedback signal is passed through a notch filter to dampen vibrations in the torque balance.

7. Apparatus as in claim 6 wherein said feedback signal is passed through a full wave rectifier to ensure that the feedback signal is the right polarity.

8. Apparatus as in claim 7 including means for measuring said feedback signal to indicate the friction between said nonrotating body and said ring.

9. Apparatus as in claim 7 including means for measuring the speed of rotation of said rotating body.

* * * * *